July 23, 1935.  G. FREUDENBERG  2,008,822
SLICING MACHINE
Filed Sept. 2, 1931  2 Sheets-Sheet 1
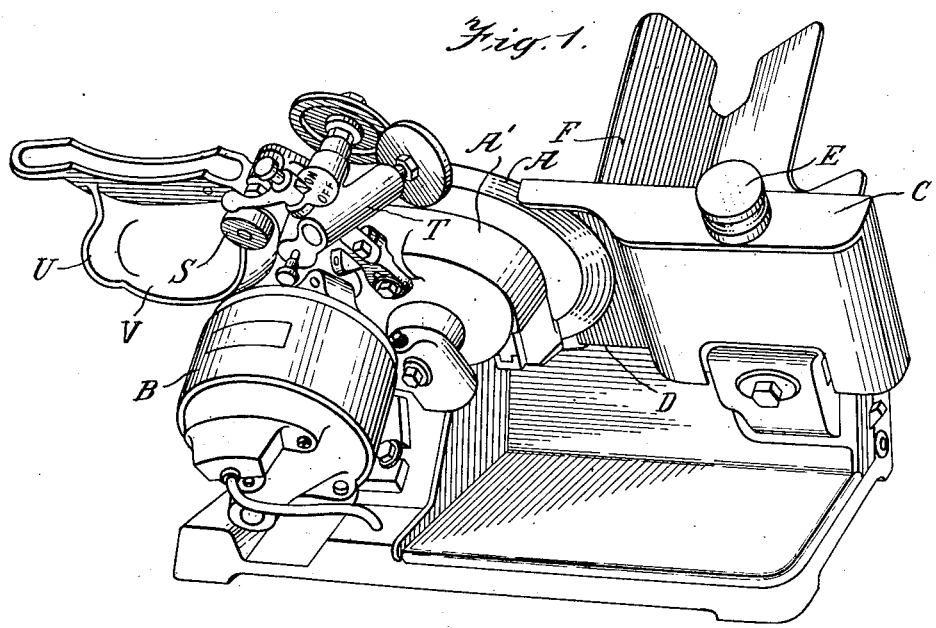
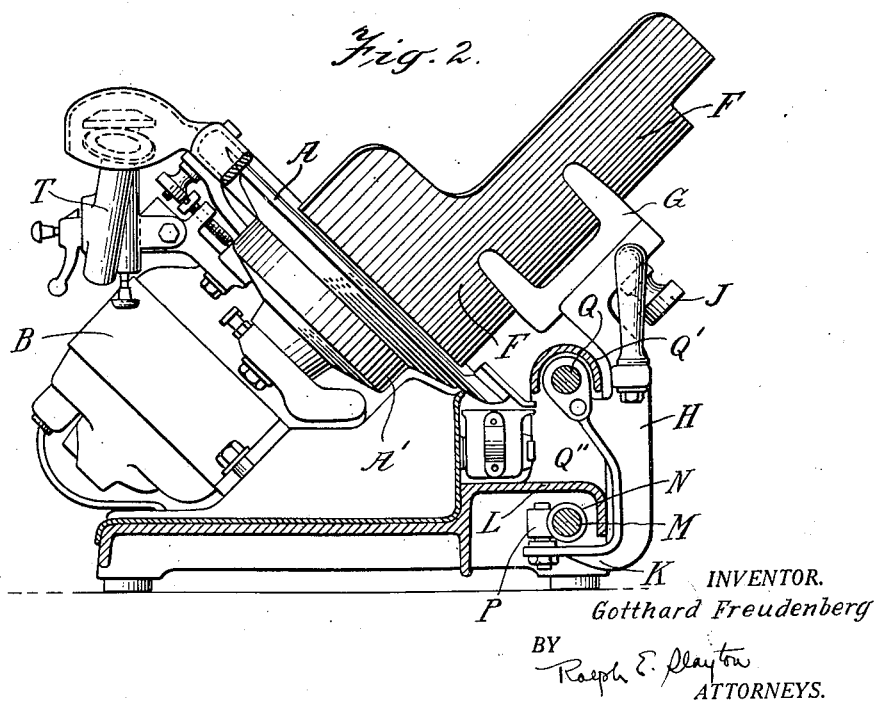
INVENTOR.
Gotthard Freudenberg
BY
Ralph E. Clayton
ATTORNEYS.

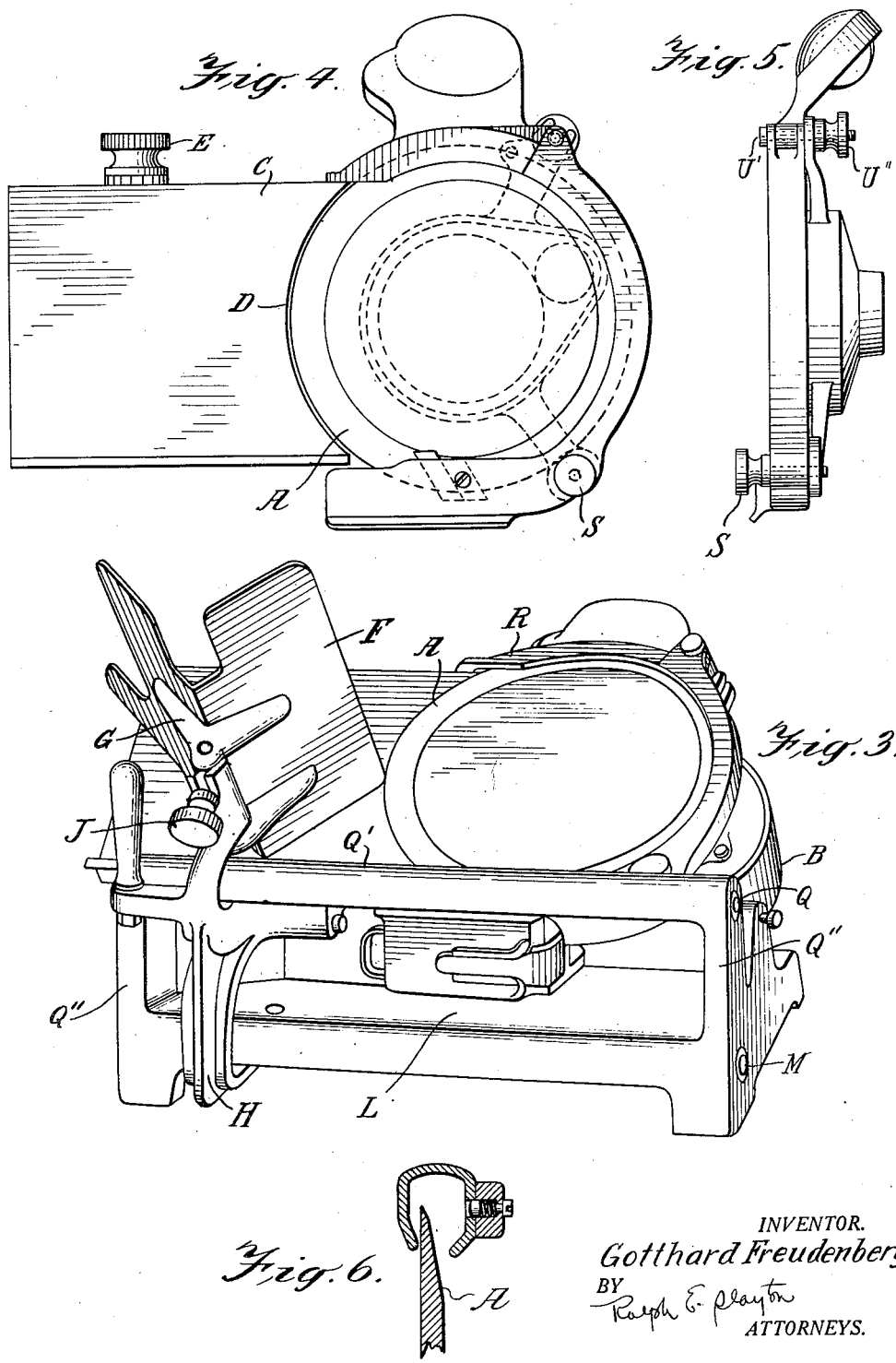

Patented July 23, 1935

2,008,822

UNITED STATES PATENT OFFICE 2,008,822

SLICING MACHINE

Gotthard Freudenberg, Brooklyn, N. Y.

Application September 2, 1931, Serial No. 560,679

1 Claim. (Cl. 146—102)

This invention relates to slicing machines and their appurtenances, and more especially to the type of machine disclosed in my copending application, Serial Number 486,908, which has matured into Patent Number 1,974,304.

One of the objects of this invention is to effectively guard the knife edge and yet afford means for sharpening it. Usually a grinder for sharpening the knife is permanently attached to some portion of the machine and arranged to be moved into operative sharpening position when desired. The knife guard of the present invention is so arranged that a portion thereof may be removed to expose the knife edge to permit the grinder to be applied and to be replaced to effectively guard the knife edge when the grinder is not in use and to simultaneously cover and conceal the grinder.

More specifically stated the knife guard comprises an annular grooved member surrounding the exposed portion of the knife edge, a segment of the guard in proximity to the grinder having one end pivoted so that it can be swung out of place to expose the knife edge for application of the grinder. This swinging portion of the knife guard comprehends a shield or shell which may be and preferably is integrally cast with the swinging portion of the guard, the shield completely concealing the grinder when the hinged portion of the guard is in closed position and the grinder in retracted or inoperative position.

Another feature of the present invention resides in the arrangement of a plurality of guide rods, one disposed above the other for supporting a sliding object feeding carriage which reciprocates back and forth past the knife edge, a portion of the base of the machine being arranged to overhang and conceal the lower guide rod and an elevated shield or guard plate, preferably cast with the base concealing the other guide rod, the carriage sliding on one of the guide rods and being prevented from rotating by a hook ended depending arm and sliding bushing engaging the other guide rod.

In the drawings, forming part of this application, there are shown several embodiments of the invention for the purpose of affording a clear understanding of the principles of the invention to those skilled in the art, but without limiting the invention to the precise details shown therein.

In said drawings:

Fig. 1 is a perspective rear view of the machine.

Fig. 2 is an end elevation of the machine partly in section.

Fig. 3 is a perspective view of the machine when viewed from the front.

Fig. 4 is a top plane view of the knife, the knife guard and the elevating tray.

Fig. 5 is an end elevation of Fig. 4, and

Fig. 6 is a fragmentary section through a portion of the knife and knife guard.

Continuing now with a more detailed description—a rotary knife A may be and preferably is driven by a motor B and may be inclined at an angle to the horizontal as described in my previous application above referred to and is of the gravity feed type shown in the patent of Sivertsen No. 1,543,343, dated June 23, 1925. A box or casing A' conceals the knife driving mechanism which may take any desired form and with which the present application is not particularly concerned. The inclined rotary knife A, in the illustrated embodiment, has a correspondingly inclined regulating table or tray C located adjacent thereto and having a cutaway portion D, conforming to the knife. The vertical movement of this tray or table C is accomplished by rotating manually operable adjusting member E, which raises or lowers the plane of the tray relatively to the plane of the knife so as to regulate the thickness of the slices in a manner for instance similar to that disclosed in the patent of Sivertsen above referred to. An inclined feed shute F is supported on a bracket G and preferably cast therewith, the axis of the chute and bracket preferably being inclined at an angle to the horizontal and substantially perpendicular to the plane of the rotary knife A and regulating tray C.

While the features of the present invention are shown as applied to a machine of the inclined knife type, the invention may be equally well used with other types of machine for instance the type of machine using a vertical knife.

The bracket G is detachably connected to a depending arm H by a manually operable clamping screw J, shown and described in copending application, the lower end K of the arm H being turned under an overhanging portion or awning L which may be and preferably is cast with the base of the machine. This awning L covers guide bar M, on which a bushing N secured to the arm K slides, and connected by a lug and bolt arrangement P, which permits the sleeve N to be easily assembled on the arm K so as to slide freely on the lower guide rod M. An upper guide rod Q disposed above guide rod M has a cover Q' which may also be and preferably is cast with upstanding end members Q'' also cast with the base of the machine to conceal the guide rod Q and prevent accidental contact by the operator's hands. The foregoing arrangement for supporting the reciprocating carriage and concealing the guide rods affords a structure which is easily manufactured, assembled, kept clean and which adds materially to the appearance of the device. An arrangement is also provided for guarding and concealing the cutting mechanism and to this end the knife A has a semi-annular grooved guard indicated in its entirety by R surrounding the knife edge as shown more particularly in Fig. 6, which protects the portion of the knife which lies beyond the limits of the cutaway portion of the regulating tray C as will be readily understood. This entire knife guard R is detachably secured to a stationary portion of the machine above the base by suitable clamping screws S which clamp the guard to the ends of radially disposed arms extending from the box or casing A' enclosing the knife driving elements. This arrangement for detachably supporting the knife guard from a position below the knife and from a point above the base affords a compact and easily cleaned structure. At the top of the slicing machine and in close proximity to the knife there is pivotally or otherwise mounted a grinder T which may be swung toward the knife to bring the emery wheels of the grinder in contact with the knife edge and thrown away from the knife edge when not in use. In order to expose the knife edge for application of the emery wheels, the guard R has a swinging or pivoted gate portion U, pivoted at U' and locked into position by a clamping screw U''. The clamping screw U'' serves to hold the gate portion in place when the grinder is not in use as will be readily understood. In order to conceal the grinder and protect it when not in use the swinging gate portion U carries an overhanging domed casing or roof V, which completely covers the grinder when the latter is not in use and which moves with the swinging portion of the guard when it is desired to use the grinder and thereby enable its action to be observed. To this end the domed roof may be and preferably is cast in one piece with the swinging gate.

It is claimed:—

A slicing machine combining a rotary knife, a knife sharpener, a hinged bracket for the knife sharpener, the knife sharpener being mounted on one side of the knife and said bracket and rotating on a pivot transversely to the axis of the knife to swing the sharpener into and out of operative position with the knife over and above the knife, a gauge plate located in substantially the same plane as the plane of the rotary knife and having a circular cutaway end portion to receive the knife, an annular grooved guard covering the entire knife edge, except that portion located in the cutaway portion, said guard having a swinging gate portion at the upper side thereof adjacent to the sharpener, said gate being mounted to swing outwardly on a pivot and having a laterally projecting dome casing adapted to cooperate with the sharpener to cover the latter when the sharpener is in inoperative position and the gate is in knife guarding position, said gate also when in knife guarding position preventing the sharpener from being swung to operative position, the gate when swung outwardly exposing a portion of the knife edge for application of said knife sharpener to the knife edge, one end of the gate portion overlying an edge of the gauge plate when the gate portion is in closed position and preventing the sharpener from being accidentally swung toward the knife.

GOTTHARD FREUDENBERG.